US005943755A

United States Patent [19]

Gauthier et al.

[11] Patent Number: 5,943,755

[45] Date of Patent: Aug. 31, 1999

[54] RATCHETING MECHANISM AND PROCESS FOR MAKING SAME

[75] Inventors: Michael T. Gauthier, Oak Creek; Christopher J. Martin, Kenosha, both of Wis.

[73] Assignee: Beere Precision Medical Instruments, Inc., Racine, Wis.

[21] Appl. No.: 09/178,776

[22] Filed: Oct. 26, 1998

Related U.S. Application Data

[62] Division of application No. 08/893,019, Jul. 15, 1997, Pat. No. 5,873,288.

[51] Int. Cl.[6] ........................ B23P 11/00

[52] U.S. Cl. ........................ 29/434; 29/458; 29/525.11

[58] Field of Search ........................ 29/458, 434, 525.11; 81/60, 61, 62, 63, 63.1, 63.2; 192/43.1

[56] References Cited

U.S. PATENT DOCUMENTS

| | | |
|---|---|---|
| 2,715,955 | 8/1955 | Stone . |
| 2,744,432 | 5/1956 | Rueb . |
| 3,356,117 | 12/1967 | Wagner . |
| 5,437,212 | 8/1995 | Thompson . |
| 5,535,648 | 7/1996 | Braun . |
| 5,551,323 | 9/1996 | Beere . |
| 5,570,616 | 11/1996 | Thompson . |
| 5,613,585 | 3/1997 | Tiede . |
| 5,619,891 | 4/1997 | Tiede . |
| 5,685,204 | 11/1997 | Braun . |
| 5,848,680 | 12/1998 | Rinner ........................ 81/62 |

*Primary Examiner*—David P. Bryant

*Attorney, Agent, or Firm*—Arthur J. Hansmann

[57] ABSTRACT

A ratcheting mechanism and a process for making same, including a tool handle and a gear and pivotal pawls which are urged into gear engagement by means of springs which can be assembled with the handle before a final cap or actuator is assembled over the end of the handle to enclose the pawls and the springs.

8 Claims, 7 Drawing Sheets

RATCHETING MECHANISM AND PROCESS FOR MAKING SAME

This is a division of application Ser. No. 08/893,019, filed Jul. 15, 1997 U.S. Pat. No. 5,873,288.

This invention relates to a ratcheting mechanism and for the process of making the ratcheting mechanism. It is particularly adaptable for use in a hand tool, such as a ratcheting screwdriver, and it is therefore disclosed in that context.

BACKGROUND OF THIS INVENTION

The prior art is aware of a variety of embodiments of ratcheting mechanisms, particularly including ratcheting screwdrivers. In the present invention, the mechanism includes a centrally located cylindrical gear and two pivotal pawls which can be placed into and out of engagement relative to the gear, for the desired ratcheting action. Further, the pivotal pawls are urged into tooth engagement with the gear by means of a spring operative on each pawl. An actuator is then employed for moving the pawls against the force of the spring and out of engagement with the gear.

Examples of such prior art are seen in U.S. Pat. Nos. 2,744,432 and 3,356,117 and 5,613,385 and 5,619,891. In those examples, the springs therein have generally a planar extending end which contacts the pawls for urging the pawls into gear engagement.

The present invention is arranged wherein the assembly screws are utilized for piloting the spring which extends front into screw heads and to the pivotal pawls for urging the pawls into engagement with the gear. One advantage is that the spring can be a flat or planar type spring which also has a curved end securely piloted or mounted relative to the tool.

Another object of the invention is to provide a ratcheting mechanism which has both the structure and the process of making whereby the tool includes an actuator cap which covers an otherwise open end of the tool, and the pawls and the springs can be inserted in the open end when the cap is removed, and subsequently the affixing of the cap to the handle itself covers and contains the pawls and the springs. This facilitates assembly of the tool and also assures a reliability of operation. Thus, the arrangement is such that it clearly distinguishes from prior art examples, such as the first two aforementioned patents, in that it utilizes the actuator of the end-cover or cap type which encloses the mechanism relative to the handle itself.

The open end of the handle receives an insert which is secured by screws that are then utilized to pilot the pawl springs.

DETAILED DESCRIPTION OF THE MECHANISM AND PROCESS OF MAKING SAME

While the following description, and the drawings, are basically directed at the tool itself, one skilled in the art will readily understand the process for making the tool.

Figure 1:
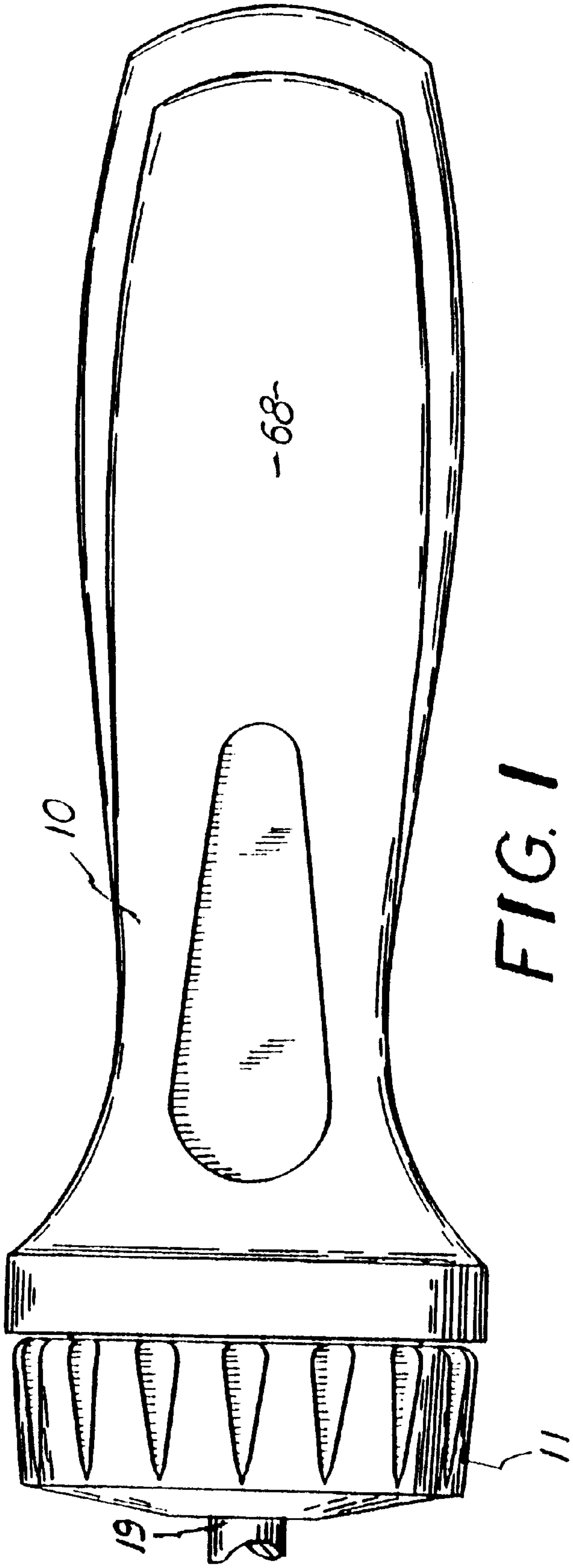
FIG. 1 is side elevational view of a screwdriver tool of this invention.
Figure 2:
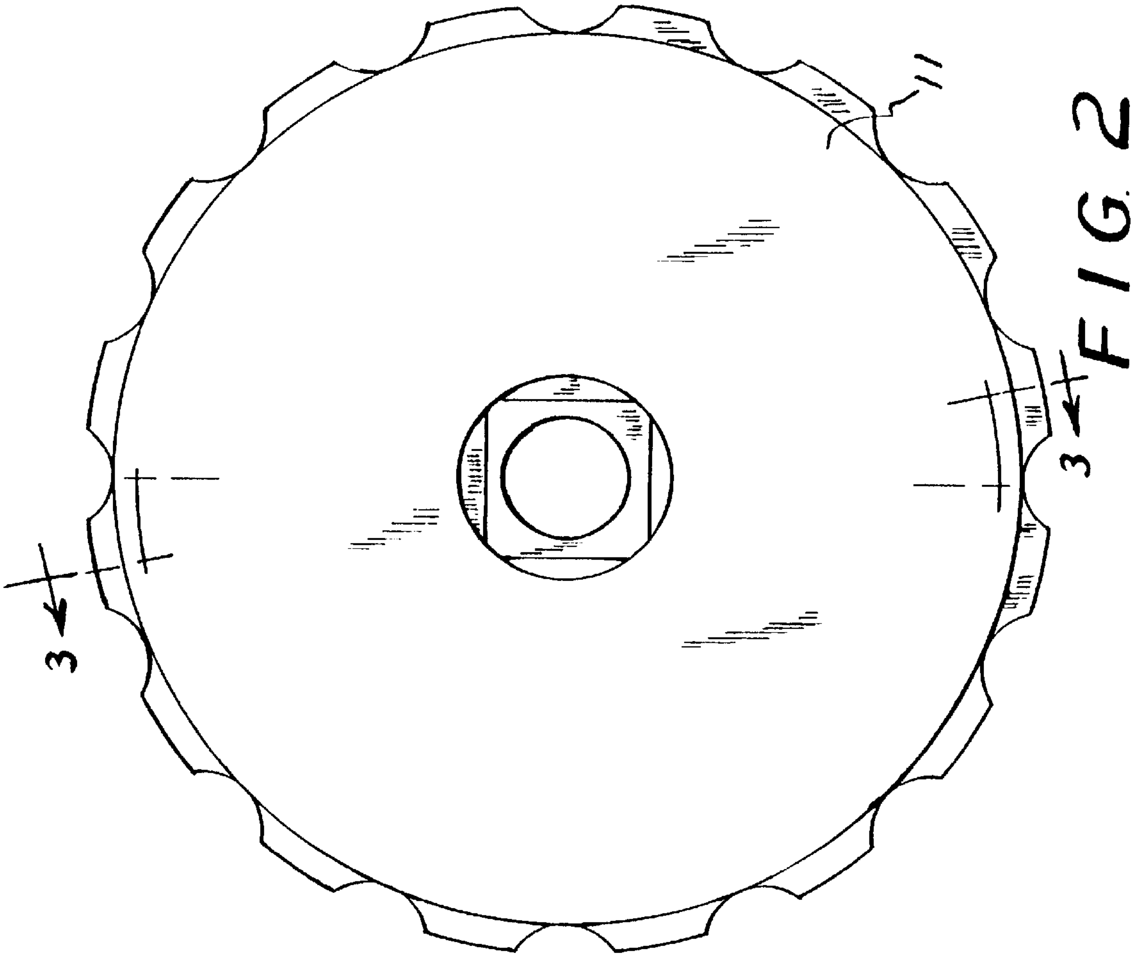
FIG. 2 is an enlarged left end elevational view of FIG. 1.

FIGS. 1 and 2 show the exterior of the tool which includes a handle 10 and an actuator 11 which is in the form of a cup shape and is thus a cap which is movably or rotatably mounted on the left end of the handle 10, as viewed in FIG. 1. The tool may be a ratcheting screwdriver, and the ratcheting mechanism itself is capable of having the ratcheting mechanism selectively placed in either a neutral position where there is drive in both directions or in a reverse or forward direction where there is ratcheting when in those two directions.

Figure 3:
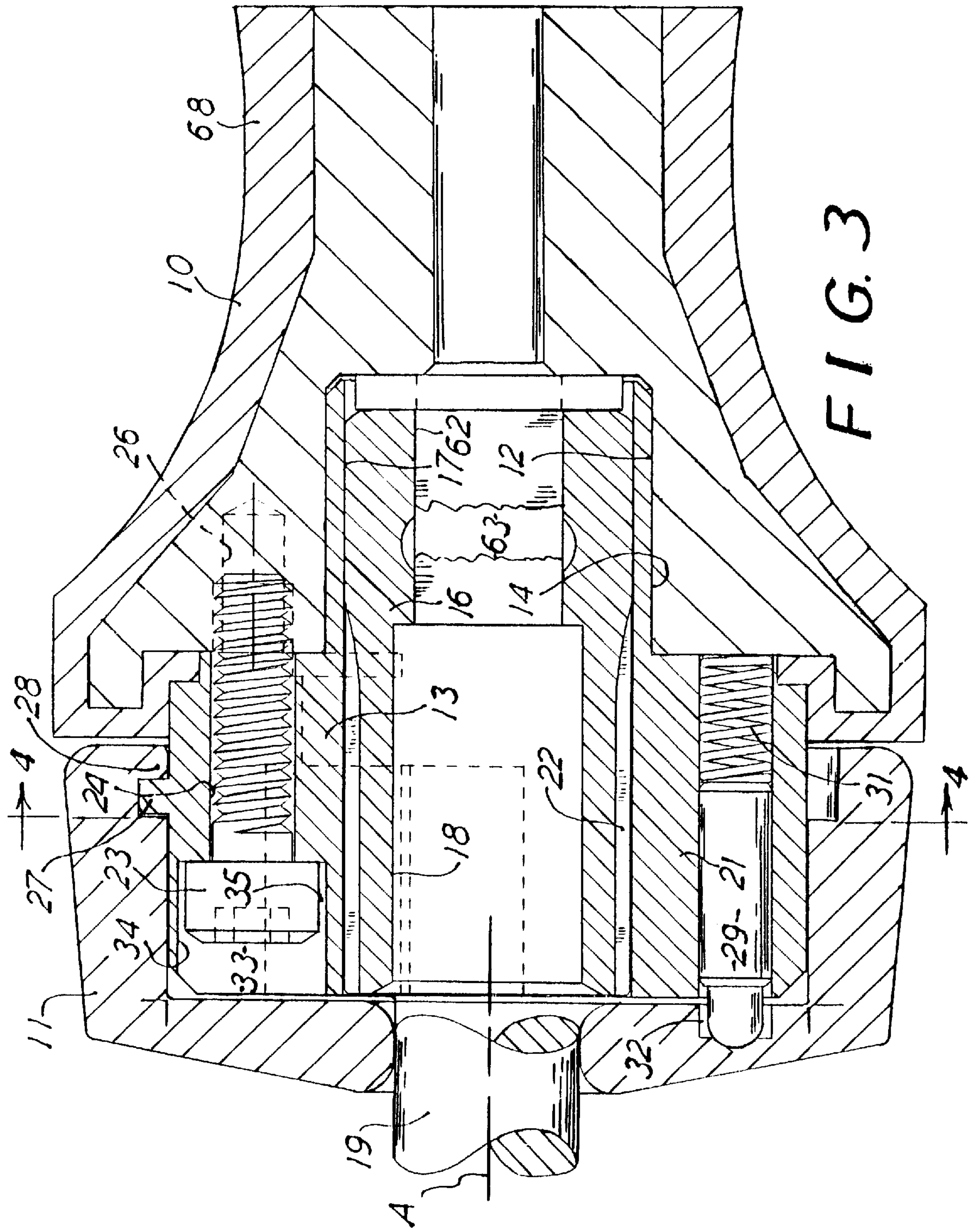
FIG. 3 is an enlarged sectional view taken on the line 3—3 of FIG. 2 and with a fragment of a tool bit added thereto.

FIG. 3 shows a fragment of the handle 10 and it shows the actuator 11 mounted on the end thereof with both parts being coaxial relative to the longitudinal axis A. The handle 10 has a circular cavity 12 exposed to the left end of the handle 10, as viewed in FIG. 3, and that cavity receives an insert member 13 which also has a cylindrical or circular portion 14 received in the circular opening or cavity 12. A cylindrically-shaped gear 16 is disposed within the cylindrical opening 17 of the insert 13 to be rotatable there in, arid the gear has its own cylindrical cavity 18 which receives a working tool, such as the fragment of the screwdriver bit 19.

The insert 13 is in the nature of a T-shape arid has the enlarged end 21 which covers gear teeth 22 on the external circumference thereof. Three cap screws 23 extend through respective screw holes 24 in the insert 13, and the screws extend into threaded holes 26 in the end of the handle 10 to thus secure the insert 13 to the handle 10.

The insert 13 and the actuator 11 have mating bayonet-type ribs 27 and 28, respectively, and these ribs interlock with each other when the cap 11 is moved onto the handle 10 and is slightly rotated for the bayonet type engagement. The insert 13 also carries a plunger 29 which is urged by a compression spring 31 into a groove 32 in the cap 11 to thus limit rotation of the cap 11 relative to the handle 10, such as seen by that groove 32 in FIG. 4.

Figure 4:
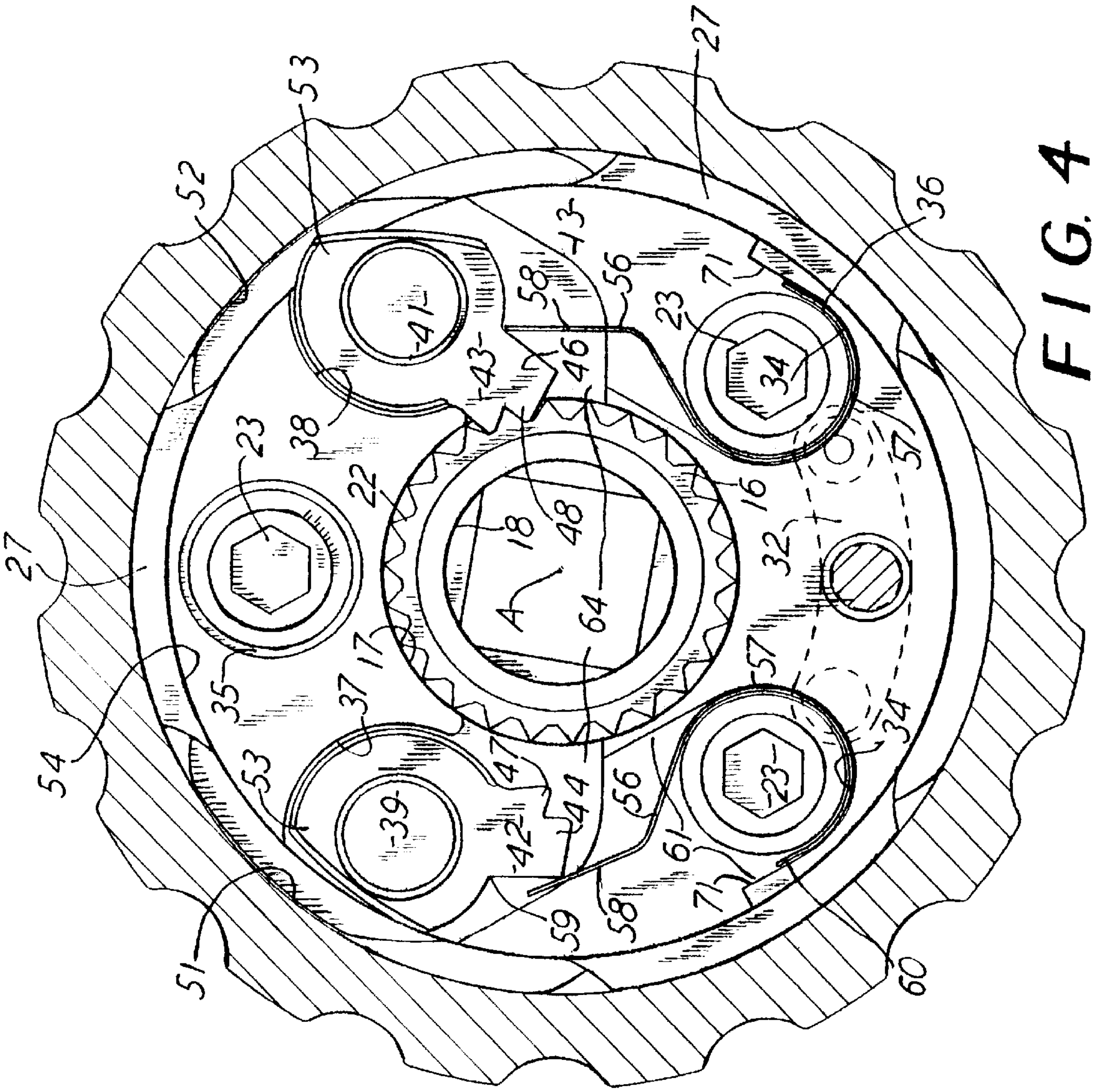
FIG. 4 is a sectional view taken along the line designated 4—4 in FIG. 3.

At this time it will also be mentioned that FIG. 3 shows the enlarged screw-head holes 33 which are defined by arcuate walls 34 in the insert 13. As will be seen in FIG. 4, the walls 34 for the lower two screw holes 33 are not completely circular but are more of only a semi-circular configuration for a purpose described later. Also, there are three such screws 23 and three enlarged screw-head holes 33 in the insert 13. Again, with reference to FIG. 4, there is thus a semi-circular space which is designated 36 between the lower two screw heads 23 and the screw-hole walls 34, and that space will be further referred to hereinafter. As shown in FIGS. 3 and 4, it is the upper screw 23 and its adjacent wall 34 that is seen in FIG. 3 and that is fully circular. For the two lower screws 23 shown in FIG. 4, the holes are semi-circular. FIG. 3 shows a circular space 35 for the upper screw, and the lower two screw spaces 36 are similar in thickness but are semi-circular, but the space thickness is shown to be as about twice the thickness of the spring therein.

Thus, FIG. 4 shows that the three screws 23 are not at equal 120 degree intervals, but the two lower screws 23 are closer together, and this provides for accommodation of the parts of this mechanism.

The insert 13 presents two pawl pockets 37 and 38 which are of an arcuate shape. Two pins 39 and 41 are affixed to the insert 13 and extend in the pockets 37 and 38 and they respectively receive pivotal pawls 42 and 43. It will also be noticed that the pawls 42 and 43 include a generally circular portion coxial to the respective pins 39 and 41 arid they also have an extending finger portion 44 and 46 respectively, which carry teeth 47 and 48 for engagement with the gear teeth 22, such as shown with the pawl 43 in FIG. 4.

The actuator 11 has two recesses or pockets 51 and 52 on the inner circular wall 54 thereof, and these pockets 51 and 52 alternately respectively align with and are disposed adjacent to the pawls 42 and 43 for receiving the corners 53 of the pawls and thereby allow the pawls to be in tooth engagement with the gear teeth 22, such as shown with the pawl 43. The arrangement of the pawl and the actuator is similar to that disclosed in U.S. Pat. No. 5,619,891.

FIGS. 4 and 7, 8, and 9 show the arrangement of the pawl-urging springs 56 which are piloted on the two lower screws 23 as seen in FIG. 4. The springs 56 have a semi-circular portion 57 which conforms and fits into the space 36 between the screw heads 23 and the screw hole wall 34, as described with FIG. 3. The drawings further show that the springs 56 include the straight or planar portion 58 which extends from the screw heads 23 and into contact with the pawl ends 44 and 46, respectively. The pawls 42 and 43 have corners 59 which receive the tips of the springs, as seen with pawls 43. In that manner, the springs 56 are controlled or trapped at both ends thereof, and they are therefore secure and operable for the purposes intended for moving the respective pawls into tooth engagement with the gear teeth 22 when the pawl corners 53 are disposed in the respective actuator pockets 51 and 52.

In the arrangement described, the springs 56 can be easily assembled as a part of the ratcheting mechanism and when the cap or actuator 11 is not yet in position. In that manner, any unskilled laborer can perform the assembly, and there is no possibility of erroneous assembly. The screw holes 33 and pawl pockets 37 have a clear opening therebetween on the insert 13 so that the springs 56 can extend between the screw head openings and the pockets, as shown. For instance, the insert wall portions designated 61 make the openings extending between those two hole locations mentioned.

In the process of making the tool, all of the operable parts, such as seen in FIG. 4, are positioned all the tool, including the springs 56, and this is done by moving those parts parallel to the longitudinal axis A, that is, by simply inserting them into the cavities in the end of the handle 10, as described. Finally, the mounting of the actuator 11 on the handle 10 covers the end openings and encloses the pawls and springs and the gear 16 in the tool, in the secure and enclosed manner. No special spring mounting holes nor any special spring covering is required in order to simply set the springs 56 onto the screw heads 23 and have the springs extending to operative contact with the respective pawls as shown. Likewise, insert 13 is made, then axially assembled.

Figure 8:
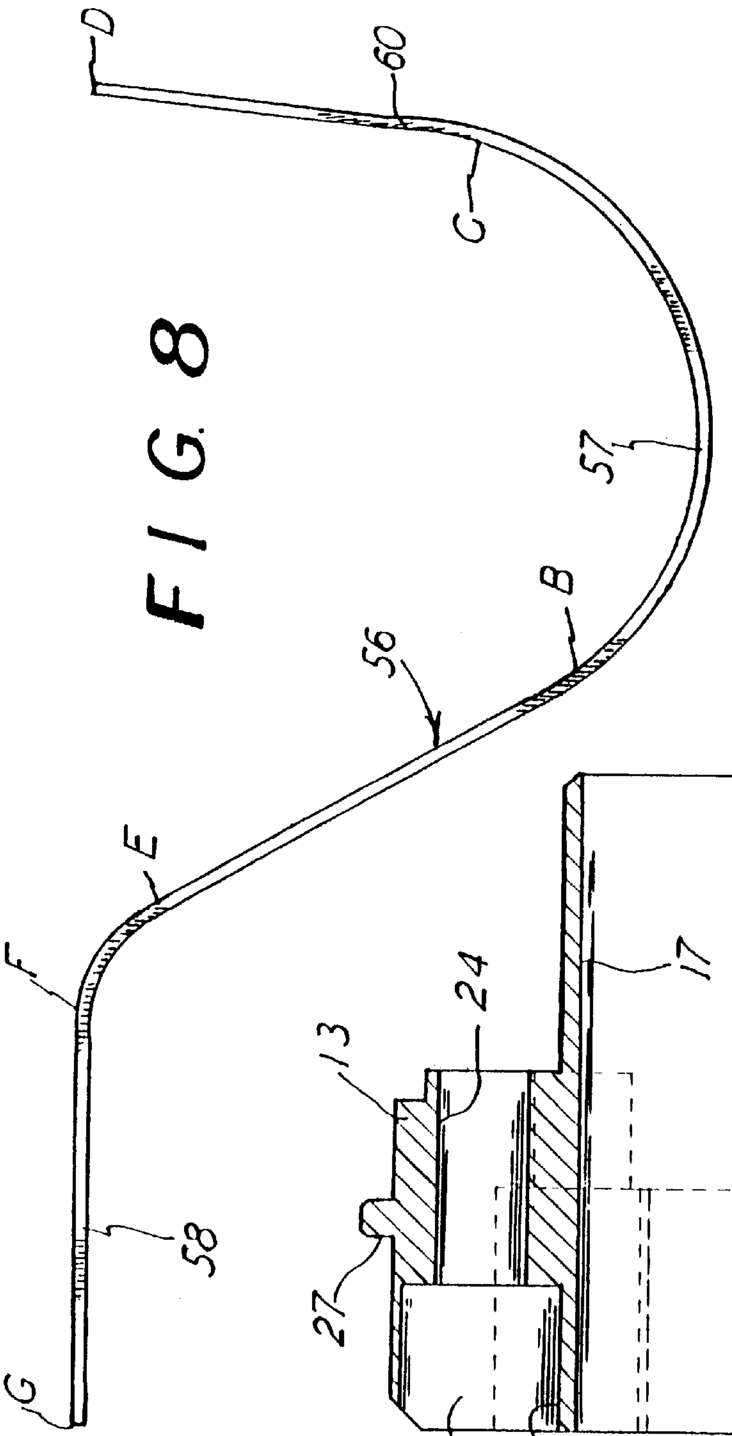
FIGS. 7, 8, and 9 are perspective, left-side elevational, and right-end elevationial views of the spring part of this invention, shown respectively.
Figure 5:
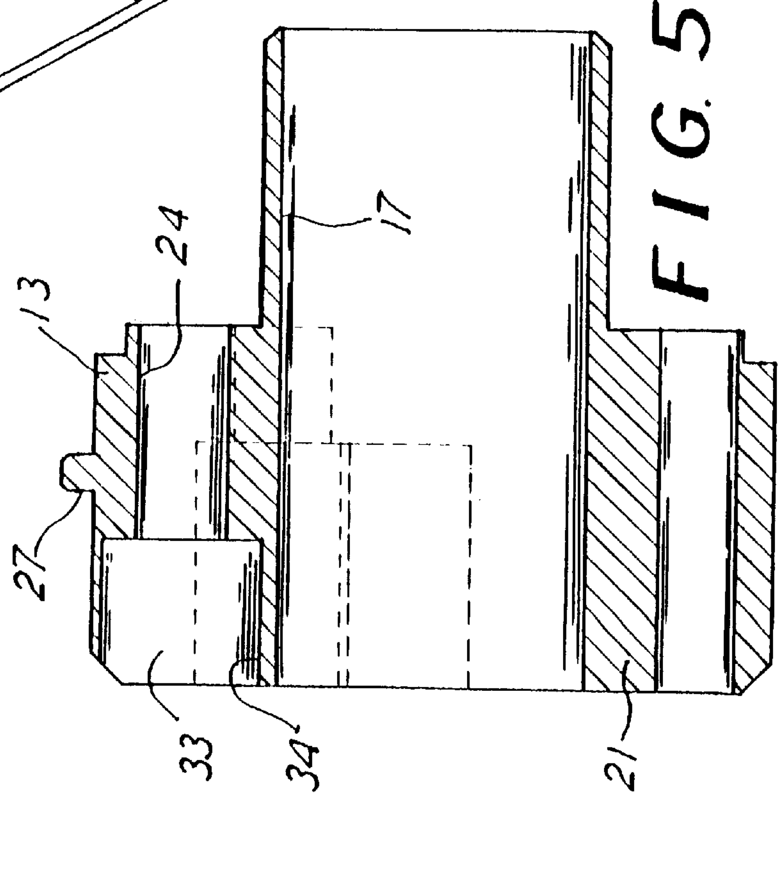
FIG. 5 is a sectional view of the insert part shown in FIG. 3.
Figure 6:
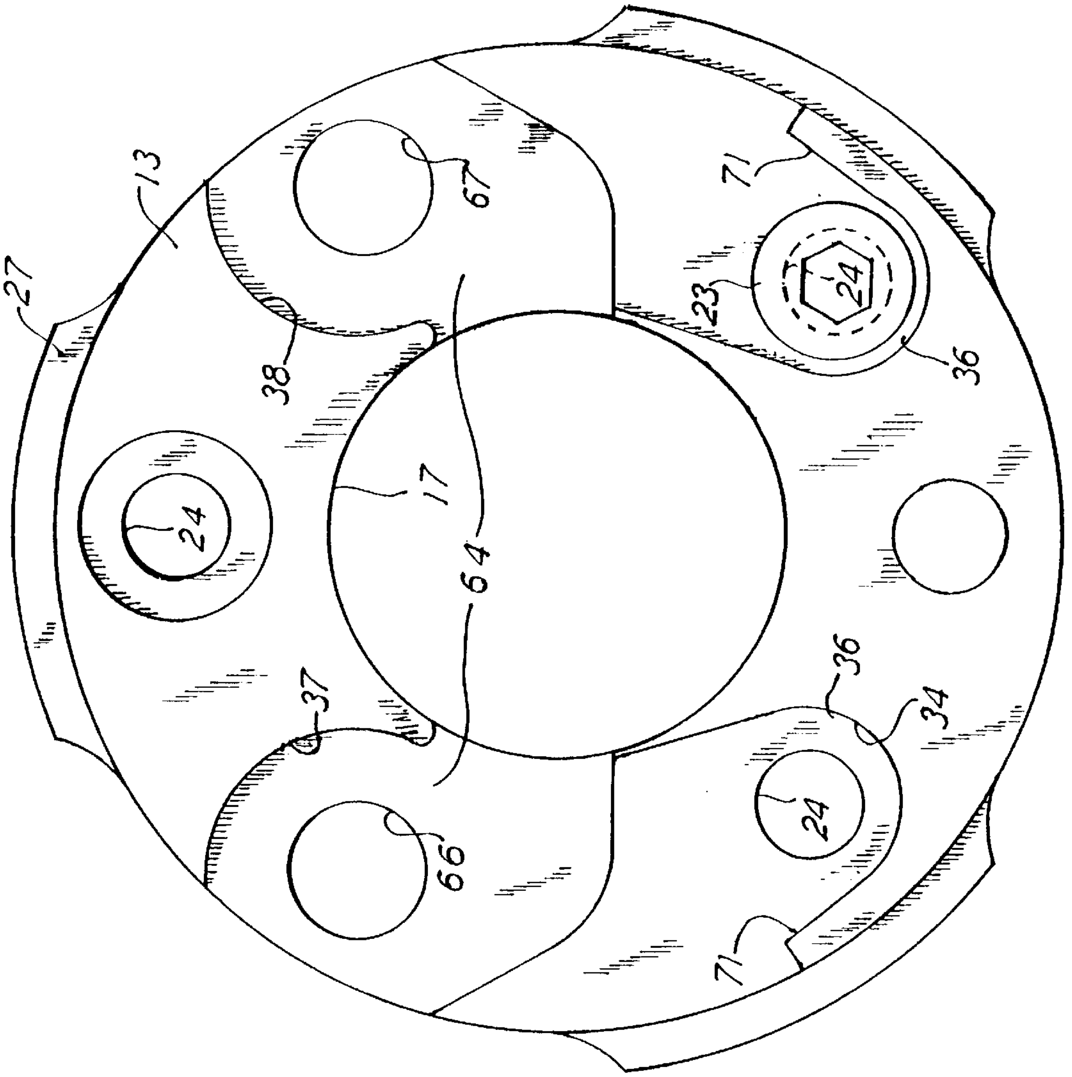
FIG. 6 is an enlarged end elevational view of the insert part.
Figure 7:
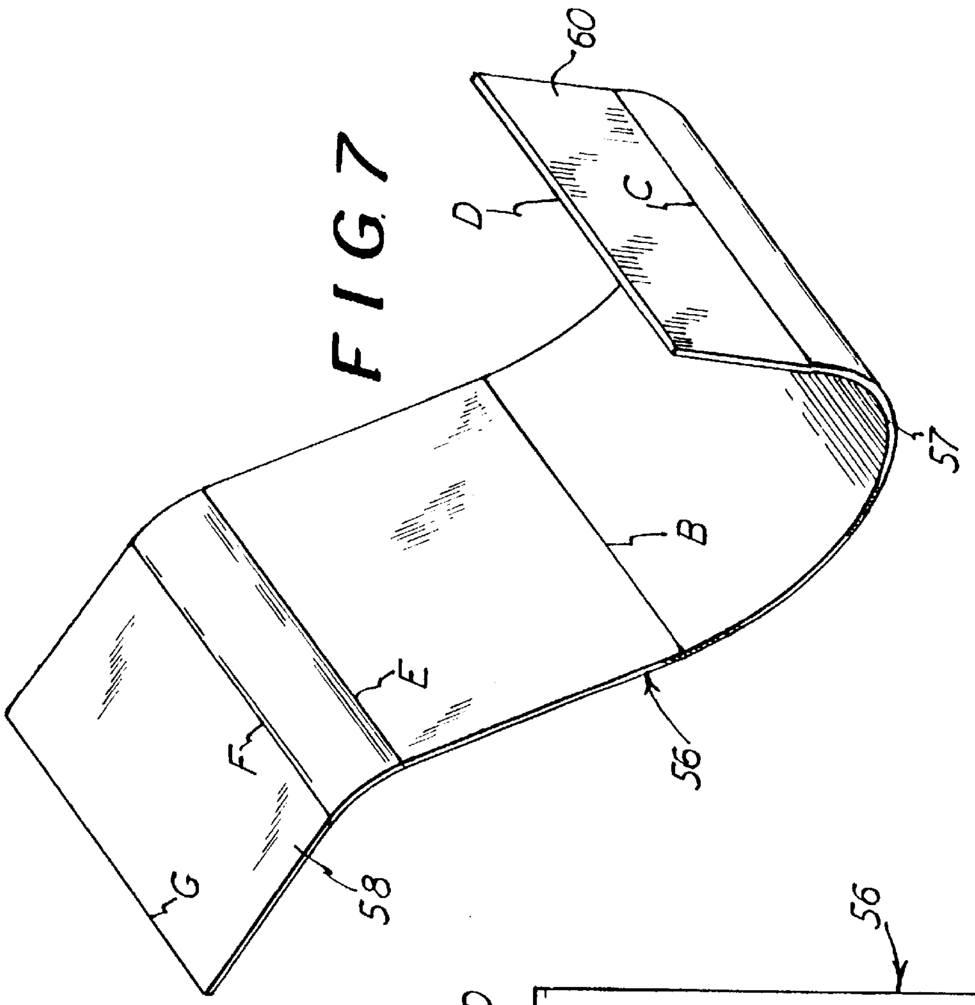
Figure 9:
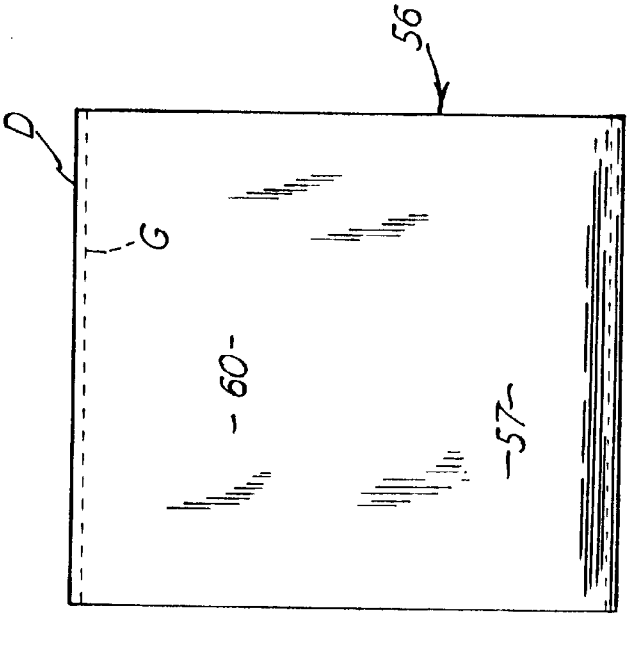

The spring 56, in its side view, as seen in FIG. 8, is in the shape of a question mark(?) or a hook. Its free-body portion 57 is shown to include an arcuate portion between points B and C, a straight portion between points C and D, and a straight portion between points B and E, and a straight portion between points F and G. The spring is of a resilient, spring material, and it thus flexes and recovers its shape. In the installed position shown in FIG. 4, the spring 56 is flexed to conform to the cylindrical shape of the screw head 23 for at least 200 degrees, so it is bound into the arcuate space 36 and is immovable when installed. So in the stalled position shown in FIG. 4, the spring is pre-stressed but easily installed by finger gripping.

The gear 16 also has a square opening 62 for receiving a mating square end of the end 63 of the bit 19 for rotational drive therebetween. Also, the insert 13 has openings 64 therein in which the pawls 42 and 43 extend for engagement with the gear teeth 22.

Thus the insert 13 can be specially made and then is affixed with the handle portion 10 by the cap screws 23 which also are employed for the mounting of the springs 56. All is assembled in movement along the axis A for easy assembly and compactness and sturdiness of the mechanism.

The insert 13 and the assembly of the pins 39 and 41 which are pressed into the insert pin holes 66 and 67 can be made separate from the handle 10. The insert material, such as stainless steel can be employed while the handle 10 call be of aluminum and its silicone cover at 68 can be applied while the handle 10 is separate from the remainder of the tool. That arrangement is of further importance because the tool is useful in medical operations where sterilizing is required. U.S. Pat. No. 5,551,323 shows the silicone cover and that disclaimer is incorporated herein by reference to it.

The insert 13 is then moved into the handle cavity 12, the screws 23 are applied, and then the pawl s 42 and 43 and the springs 56 can be easily installed, all that assembly occurring in the longitudinal axial direction along axis A. The cap 11 is positioned over the handle end and it presents ribs 28 which engage ribs 27 on the insert for a bayonet type connection, as disclosed in U.S. Pat. No. 5,848,680, which is a part of this disclosure by this reference thereto.

In the piloting of the springs 56, the spring ends 58 abut flat walls 71 on the insert 13 so the springs 56 are respectively secure in position and properly force on the pawls 42 and 43. Springs 56 thus have arcuate portions 57 and planar opposite end portions 58 and 60. Portion 60 is flat against the insert wall 71 defined by the insert upstanding portion designated 72. Thus the springs 56 are securely trapped between the insert walls and the screw heads 23, and the springs are under tension in that position so they cannot slide around the screw heads 23.

In the process of making, the handle cover 68 is molded before the insert is affixed. Thus the insert is not subjected to the molding process.

We claim:

1. A process for making a ratcheting mechanism, comprising the steps of:

forming a tool handle having a longitudinal axis and a cavity in the end of said handle and with said cavity facing outwardly along said handle axis and being co-axial therewith and having threaded screw holes disposed around said cavity, forming an insert with a opening having a central opening axis and having pockets and having screw holes with each thereof having a longitudinal axis disposed parallel to said opening axis, disposing pawls in said pockets, placing said insert into said cavity with said opening axis being coaxiva with said handle axis and to be facing outwardly along said handle axis, disposing a gear in said opening to be in rotation driving relative one with said pawls, affixing said insert to said handle by screwing screws into said screw holes and with said screws having heads protecting from said insert, placing a spring on each of said screws by moving said springs in the direction parallel to said handle axis to thereby have said springs respectively piloted on said screw heads and to have said springs respectively extend into contact with a respective one of said pawls, and affixing a pawl actuator onto said handle for covering said cavity and for containing said pawls and said springs in said insert.

2. The process of making a ratcheting mechanism as claimed in claim 1, wherein said screw holes of said insert are defined by walls therearound and said screw heads are spaced from said walls to have a space around said screw heads, and said springs are disposed to have one end of each thereof respectively disposed in said space extending around respecitve ones of said screw heads and with the other end of each of said springs being disposed in contact with a respective one of said pawls, all for the insertion of said springs into said insert in said parallel direction.

3. The process of making a ratcheting mechanism as claimed in claim 2, wherein each said spring one end is flexed into tension for anchoring on the respective one of said screw heads.

4. The process of making a ratcheting mechanism as claimed in claim 1, including the steps of affixing pivot pins on said insert central with respect to said pockets, pivotally mounting said pawls onto said pins and doing so before said insert is inserted into said tool cavity, and inserting said springs into said screw holes and doing so after said insert is screwed onto said handle.

5. In a process of making a ratcheting tool, the steps comprising:

forming a handle of a metal material having a cavity in one end thereof, molding a silicone cover over said handle, forming an insert of a metal material and being shaped to fit into said cavity and having a central opening, depositing said insert into said cavity after said cover is molded onto said handle, applying screws between said insert and said handle for affixing said insert onto said handle and having said screws project clear of said insert, positioning pawls onto said insert to be movable thereon, positioning a gear in said insert, and mounting springs on the projections of said screws to be affixed thereon and having said springs extend into contact with said pawls to urge said pawls into engagement with said gear.

6. The process of making a ratcheting mechanism as claimed in claim 5, including the steps of affixing pivot pins on said insert, pivotally mounting said pawls onto said pins, and mounting said springs onto said screws after said insert is screwed onto said handle.

7. A process for making a ratcheting mechanism, comprising the steps of:

forming a tool handle having a longitudinal axis and having a cavity in the end of said handle and with said cavity facing outwardly along said handle axis and being co-axial therewith and having threaded screw holes disposed around said cavity, forming an insert with a opening having a central opening axis and having screw holes with each thereof having a longitudinal axis disposed parallel to said opening axis, pivotally disposing pawls on said insert, placing said insert into said cavity with said opening axis being co-axial with said handle axis and to be facing outwardly along said handle axis, disposing a gear in said opening to be in rotation driving relation with said pawls, affixing said insert to said handle by screwing screws into said screw holes in both said handle and said insert and with said screws having heads projecting from said insert, placing a spring on each of said screws by moving said springs in the direction parallel to said handle axis to thereby have said springs respectively piloted on said screw heads and to have said springs respectively extend into contact with a respective one of said pawls, and affixing a pawl actuator onto said handle for covering said cavity and for containing said pawls and said springs in said insert.

8. The process of making a ratcheting mechanism as claimed in claim 7, including the steps of affixing pivot pins on said insert and with said pins having pivot axes extending parallel to said handle axis for pivotal mounting of said pawls on said pins, pivotally mounting said pawls onto said pins, and affixing said actuator onto said handle for rotation thereon about said handle axis.

* * * * *

UNITED STATES PATENT AND TRADEMARK OFFICE
CERTIFICATE OF CORRECTION

PATENT NO. : 5,943,755

DATED : Aug. 31, 1999

INVENTOR(S) : Michael T. Gauthier
Christopher J. Martin

It is certified that error appears in the above-identified patent and that said Letters Patent is hereby corrected as shown below:

In Claim 1: column 4, six lines from the bottom,cancel "relative one", and insert thereat --relation--; and column 4, three lines from the bottom, cancel "protecting"and insert thereat --projecting--.

Signed and Sealed this

Eleventh Day of April, 2000

Attest:

Q. TODD DICKINSON

*Attesting Officer*

*Director of Patents and Trademarks*